(No Model.)

G. SIBLEY.
DENTAL HANDPIECE.

No. 585,126.                                   Patented June 22, 1897.

Witnesses.
A. V. Grouts
A. V. Blackwood.

Inventor.
Gideon Sibley,
per John R. Nolan
Attorney.

UNITED STATES PATENT OFFICE.

GIDEON SIBLEY, OF PHILADELPHIA, PENNSYLVANIA.

DENTAL HANDPIECE.

SPECIFICATION forming part of Letters Patent No. 585,126, dated June 22, 1897.

Application filed April 18, 1896. Serial No. 588,166. (No model.)

*To all whom it may concern:*

Be it known that I, GIDEON SIBLEY, a citizen of the United States, residing at the city and county of Philadelphia and State of Pennsylvania, have invented certain new and useful Improvements in Dental Handpieces, of which the following is a full, clear, and exact description, reference being had to the accompanying drawings, forming a part of this specification.

This invention relates to dental handpieces, having especial reference to tool clamping and releasing mechanism therefor, such, for example, as illustrated in Letters Patent of the United States No. 550,113, dated November 19, 1895.

The patented construction just mentioned comprises a suitable sheath or case, a longitudinally-slotted rotatable spindle therein, a tool-holding chuck seated in the forward socketed portion of said spindle and arranged to open and close by longitudinal movement, an endwise-movable arm seated in the slot of the spindle in a manner to act against the chuck, said arm having a lateral cam-surface thereon, and a sliding part arranged to engage directly the said cam-surface, said arm being adapted to slidingly engage a suitable abutment, whereby such engagement causes a direct endwise movement of the arm and thereby of the chuck, as will more fully appear by reference to said Letters Patent.

The object, primarily, of the present invention is to provide simple and efficient means for actuating the chuck to effect the clamping and the releasing of the tool therein as desired, also to provide a novel construction of duplex chuck, whereby an extended clamping action upon the tool is secured, as will hereinafter appear.

Figure 1:
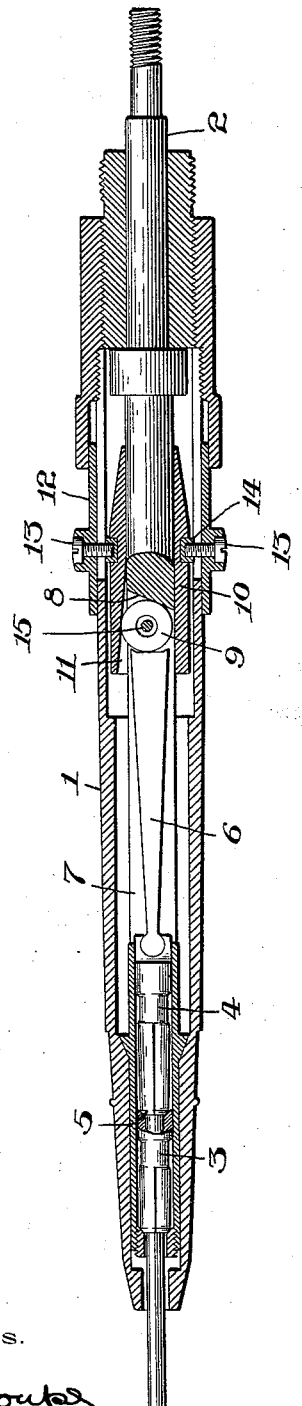
Figure 2:
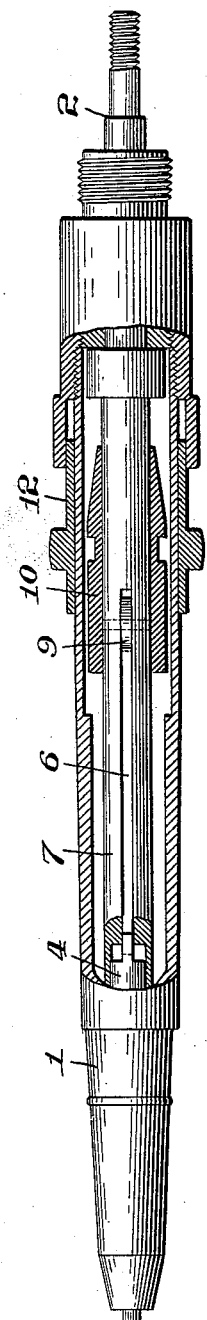
Figure 3:
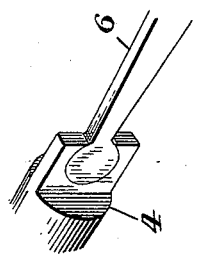

In the drawings, Figure 1 is a longitudinal section of the handpiece with a tool clamped therein. Fig. 2 is a sectional elevation thereof, the plane of the section being on a right angle to that of Fig. 1. Fig. 3 is a detail perspective of a portion of the toggle-arm and chuck.

The numeral 1 designates the sheath or case of the handpiece, and 2 the rotatable spindle therein provided with a socket in its forward end for the reception of the tool-holding devices. In the patented construction above referred to these devices comprised a chuck embodying a cylindrical rear portion provided with forwardly-extending spring-jaws having conical or tapered extremities, which extremities abutted against the correspondingly-beveled edge of a perforated nut or head screwed into the socketed end of the spindle. Hence when the chuck was forced forward the jaws thereof, coacting with the opposing edge of the nut, were forced inward to clamp the tool in place and when the chuck was released the jaws resumed their normal or open position, so as to release the tool.

In the present case I employ a chuck 3 of the character above stated and in conjunction therewith a similar chuck 4, the tapered extremities of the jaws of which coact with the correspondingly-beveled rear portion 5 of the first-named chuck, so that when the rearward chuck is moved forward its jaws will be compressed by the portion 5, and at the same time the forward chuck will be advanced and its jaws compressed, thereby effecting a simultaneous clamping of the two chucks upon the drill-shank and insuring an extended and steady holding thereof. When the chucks are freed from the rearward pressure, they will simultaneously release the drill.

Pivotally fitted to a socket in the rear end of the chuck 4 is one end of an arm 6, which extends within a longitudinal slot 7 in the spindle, which arm is adapted to be actuated similarly to a toggle to effect the clamping action of the chucks. The rear end of the slot is provided with a beveled or cam surface 8, between which and the adjacent end of the arm is interposed a disk or roller 9. Surrounding the spindle is a sleeve 10, in the inner edge of which is formed an appropriately-inclined groove or way 11, into which the disk or roller extends, to the end that when the sleeve is moved forward the incline therein will depress the disk or roller against the opposing beveled surface 8 in the spindle, thereby effecting the advancement and partial rotation of the disk or roller, so as to swing the arm into alinement, or substantially so, with the chucks and effect the forcible advancement and clamping of the latter. When the sleeve is retracted, the pressure upon the arm is released, and the chucks in consequence resume their normal or open position.

The sleeve 10 is operated by means of an exterior sleeve 12, which is mounted on the sheath and is provided with diametrically-opposite pins or screws 13, that enter the shoes 14 in a circumferential groove in the inner sleeve. Other means for operating the latter sleeve may be employed.

I preferably, though not essentially, centrally perforate the disk or roller 9 and extend through the spindle and the perforation a pin 15 of smaller diameter than the latter, which pin while thus preventing displacement of the disk or roller does not affect its free action under the conditions described.

I claim as my invention—

1. In a dental handpiece, the combination with the spindle, of a chuck seated therein and adapted to be opened and closed by longitudinal movement, a second chuck arranged rearward of the forward chuck and provided with spring clamping-jaws coacting with the beveled rearward portion of said forward chuck, and means for advancing the rearward chuck and therewith the forward chuck, said means including an arm engaged with the rearward chuck, a roller bearing against said arm, and means for actuating the roller to effect the movement of the arm and chucks, substantially as described.

2. The combination of a member provided with an inclined surface, an arm or transmitting device opposite thereto, an interposed roller, and a slide provided with an inclined portion bearing on said roller, substantially as described.

3. In a dental handpiece, the combination, with the spindle, of a chuck adapted to be opened and closed by longitudinal movement, an arm, an inclined bearing-surface, a roller intermediate said arm and bearing-surface, and means for varying the positions of the roller and the inclined surface in respect to each other, substantially as described.

4. In a dental handpiece, the combination, with the spindle, of a chuck adapted to be opened and closed by longitudinal movement, an inclined bearing-surface on the spindle, a roller engaged by said surface, operative connections between said roller and the chuck, and means for moving the roller on said inclined surface, substantially as described.

5. In a dental handpiece, the combination with the spindle, of a chuck adapted to be opened and closed by longitudinal movement, an arm connected with said chuck, a roller bearing against said arm, and means for actuating the roller to effect the movement of the arm and the chuck, substantially as described.

6. In a dental handpiece, the combination with the spindle, of a chuck adapted to be opened and closed by longitudinal movement, an arm connected with said chuck, a sleeve on the spindle provided with an inclined portion, and a roller bearing against the said arm, the said inclined portion, and an inclined surface on the spindle, substantially as described.

7. In a dental handpiece, the combination with the longitudinally-slotted spindle, of a chuck adapted to be opened and closed by longitudinal movement, an arm pivotally connected with said chuck and extended into the slot in the spindle, the rear end of the slot being inclined as described, a roller interposed between such end and the opposing end of the arm, and a slide or sleeve provided with an inclined way into which the roller extends, substantially as set forth.

8. In a dental handpiece, the combination with the longitudinally-slotted spindle, of a chuck adapted to be opened and closed by longitudinal movement, an arm pivotally connected with said chuck, and extended into the slot in the spindle, the rear end of the slot being inclined as described, a centrally-perforated roller interposed between such end and the opposing end of the arm, a slide or sleeve provided with an inclined way into which the roller extends, and a pin in the spindle extending freely through the orifice in the roller, substantially as described.

In testimony whereof I have hereunto affixed my signature in the presence of two subscribing witnesses.

GIDEON SIBLEY.

Witnesses:
JOHN R. NOLAN,
ANDREW V. GROUPE.